July 5, 1927.
H. H. BUGGIE
1,634,449
SLIDING WINDOW FOR VEHICLE BODIES
Filed June 19, 1920
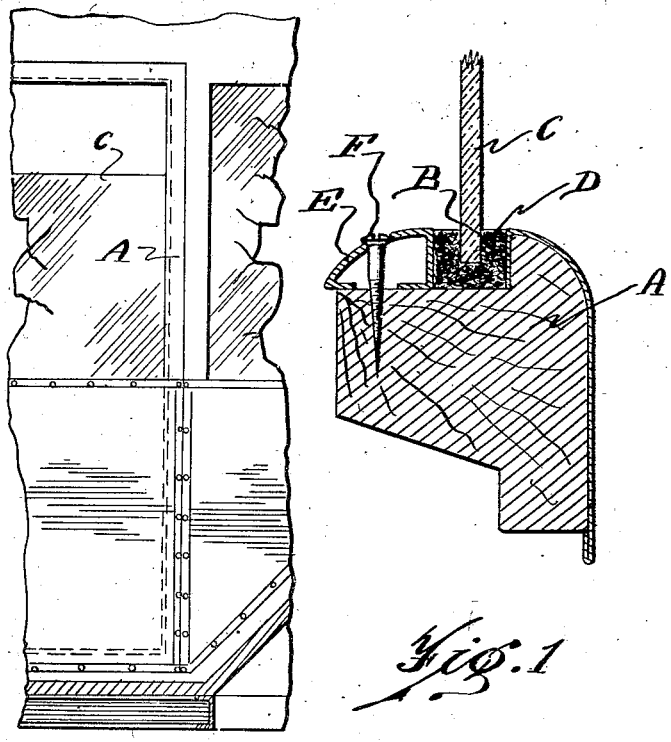
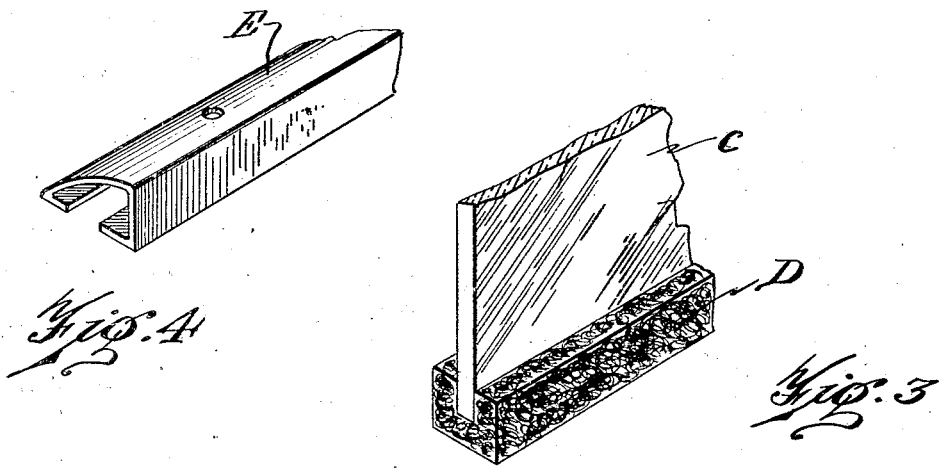
Inventor
Horace H. Buggie
By Whittemore, Hulbert and Whittemore
Attorneys Patented July 5, 1927.

1,634,449

UNITED STATES PATENT OFFICE.

HORACE H. BUGGIE, OF TOLEDO, OHIO, ASSIGNOR TO THE DURA COMPANY, OF TOLEDO, OHIO, A CORPORATION OF DELAWARE.

SLIDING WINDOW FOR VEHICLE BODIES.

Application filed June 19, 1920. Serial No. 390,243.

The invention relates to sliding windows of that type in which a frameless glass is slidably mounted in guides in the window frame. It is the object of the invention to obtain a construction which is anti-rattling, thoroughly weather-proof, and which may be easily applied. To this end the invention comprises the construction hereinafter set forth.

In the drawings:

Figure 1 is an interior view of a vehicle door to a window of which the invention is applied;

Figure 2 is a cross-section through the frame of said window and guiding means for the glass;

Figures 3 and 4 are perspective views, respectively, of the securing stop and the felt guide for engagement with the glass panel.

A is the post or frame in which the sliding window is mounted, which is formed with a rabbet B therein. C is the sliding glass, which is of dimensions to extend between the posts A and overlap the rabbet B, but with a clearance between its edges and the posts. D is a felt strip which is, in the particular construction in the drawings, formed with a channel to engage an edge of the glass and together with the glass is placed in engagement with the rabbet. E is a stop, preferably formed of a sheet metal strip which is pressed against the felt on the opposite side from the shoulder of the rabbet and is secured to the post by suitable means, such as the screws F.

In assembling the structure as above described, the stop E is pressed against the felt so as to cause a slight compression thereof. This will cause a resilient yieldable pressure of the felt upon the glass, which, while permitting free sliding movement thereof, will prevent any lost motion or rattling. The joint is also thoroughly weatherproof. The construction is also both cheaper to manufacture and easier to install than constructions where the glass is mounted in a frame or metallic edge strip, or where the felt is cemented to the glass and slides in the frame.

What I claim as my invention is:

In a window, the combination with a sashless transparent panel, of a yieldable runway slidably engaged in by said panel, a frame having a shoulder engageable by said runway, a member secured to said frame and cooperating with said shoulder to compress said runway, said member being formed of sheet metal folded to tubular shape and having spaced inner and outer marginal portions engaging said frame, a wall extending from said inner marginal portion and engaging said runway and a second wall extending from said outer marginal portion to said first-mentioned wall, and securing means extending through said second wall and between said marginal portions into said frame.

In testimony whereof I affix my signature.

HORACE H. BUGGIE.